3,037,012
CONTINUOUS POLYMERIZATION OF ETHYLENE

Wolfgang Lehnerer, Ludwigshafen (Rhine), and Herbert Friederich, Worms, Germany, assignors to Badische Anilin- & Soda-Fabrik Aktiengesellschaft, Ludwigshafen (Rhine), Germany
No Drawing. Filed Nov. 13, 1957, Ser. No. 696,020
Claims priority, application Germany Nov. 14, 1956
4 Claims. (Cl. 260—94.9)

This invention relates to a process for the continuous polymerization of ethylene with a catalyst of aluminum and titanium tetrachloride which comprises continuously rubbing off the polyethylene formed on the surface of the aluminum particles during the polymerization and separating the polyethylene from the aluminum particles.

It is known to polymerize ethylene or other olefines with the aid of a mixture of aluminum powder and a metal compound of the 4th to 6th sub-groups of the periodic system to solid polyolefines. The use of aluminum metal, as compared with the aluminum alkyls used in other process, has the advantage of the more simple and less dangerous production and handling of the catalyst. In the continuous carrying out of this polymerization process, however, the uniform supply of the necessary aluminum powder and the removal of the catalyst offers difficulty. The polymerized olefine formed is contaminated with the catalyst residues and must be purified. A separate purification process is necessary for the removal of the residues of aluminum.

We have now found that ethylene can be continuously polymerized especially advantageously with a catalyst of aluminum, a halide of a metal of the 4th to 6th sub-groups of the periodic system and if desired aluminum chloride, by continually rubbing off the polyethylene formed during the polymerization on the aluminum particles and separating the detached polyethylene from the aluminum particles which are of higher specific gravity.

The process according to this invention may also be carried out in the presence of a liquid indifferent diluent, in which the halide of a metal of the 4th to 6th sub-groups of the periodic system is soluble and the polyethylene formed is insoluble.

The circulation of liquid may then be so arranged that only the polymer is entrained by the stream of liquid and not the specifically heavier aluminum at the bottom of the reaction vessel. The polymer collects in a separator and can be removed therefrom. The polymer obtained is free from metallic aluminum and can be freed from residues of metal halide by treatment with alcohols or other solvents.

As metal halides of the 4th to 6th sub-groups of the periodic system which are soluble in an organic diluent there are suitable for example vanadium-3-chloride, titanium-4-chloride or vanadium oxychloride.

The polymerization conditions can be varied in the same way as is known for example for the catalyst system aluminum and/or aluminum alkyl-titanium-4-chloride. Thus the olefine may be caused to act without pressure or under a pressure up to about 200 excess atmospheres. As diluents there may be used indifferent liquids in which the polymer is insoluble, preferably hydrocarbons, as for example heptane, cyclohexane, benzene, ethylbenzene or mixtures of the same. The temperature is kept between 20° and 100° C., preferably between 30° and 80° C. A special advantage of this process is that the heat of reaction set free during the polymerization is carried away with the stream of liquid. In this way the reaction vessel can be kept at constant temperature during the polymerization without difficulty.

The metal halides of the 4th to 6th sub-groups of the periodic system are preferably used in 0.1 to 1% solution. They are slowly used up during the polymerization and must be correspondingly replaced. The speed of polymerization can be increased by adding about the same amount of aluminum chloride.

The pieces of aluminum may be used in any form, for example as balls, cylinder, cubes or coarse chips, preferably with a diameter or an edge length of about 5 to 20 millimeters.

In order to reduce abrasion of the aluminum particles, it is often preferable to use round aluminum particles or cubes of which the corners and edges have been ground off. Instead of pure aluminum there may also be used alloys of various metals with aluminum. The aluminum may be alloyed for example with magnesium, silicon, manganese, iron, copper or zinc. In many cases it is also preferable to use hardened aluminum alloys in order to avoid self-abrasion of the metal.

In order to accelerate the separation of the polyethylene formed on the surface of the aluminum particles, there may also be used small steel or porcelain balls of about the same size as the aluminum particles used. The number of steel or porcelain balls used should however preferably not amount to more than half the number of aluminum particles.

The aluminum particles are preferably activated before being charged into the reaction vessel in order to ensure the stripping off of the polymer from the aluminum particles. For this purpose the aluminum particles may be treated with halogen or a halogen compound, such as hydrogen chloride, aluminum chloride or ethylene bromide, if desired dissolved in a solvent, such as benzene or another aromatic hydrocarbon. Whereas in other processes the aluminum loses its activity after a certain time and the polymerization then comes to a standstill, aluminum which has been activated with a halogen compound retains its activity. The aluminum particles are slowly used up and in continuous operation must be replaced at intervals of a few months.

The aluminum particles are kept in constant movement during the polymerization so that the polymer formed on the surface is stripped off by the rubbing together of the aluminum particles. For this purpose a suitable stirrer may be used. It is also possible to charge the aluminum particles into a rotary drum which dips into the reaction solution and to cause them to move therein.

As the separator for the polymer there is preferably used a vessel which has a volumetric content not less than that of the reaction vessel in order that the speed of flow of the liquid entering it may be reduced so that the entrained polymer falls to the bottom of the separator and can be run off.

The liquid can be circulated by means of a liquid pump. It is also possible, however, to provide for powerful gassing with the gaseous monomers to be polymerized by means of a circulating gas blower, the liquid being caused to circulate with the aid of the gas current.

When polymerizing in the absence of a liquid diluent, the aluminum particles on the surface of which the polymerization of the ethylene is to take place, are preferably charged into a vessel with a perforated sieve-like bottom. The openings in the bottom should be so small that the aluminum particles cannot fall through. For example if the length of the edges of the aluminum particles used is 5 millimeters, the size of the holes should be about 2 millimeters. When using larger aluminum particles, the size of the perforations can be correspondingly larger. Through the vessel, upwardly or downwardly, there is then led a gas mixture of ethylene and the vapor of a compound, preferably a halide, of a metal of the 4th to 6th sub-groups of the periodic system, for example titanium-4-chloride vapor. The gas may also have incorporated with it aluminum chloride vapor if desired. Solid polyethylene then separates on the surface of the aluminum particles. The procedure may also be that an inert gas, as for example nitrogen, is enriched with the metal halide vapor and this gas mixture is mixed with the olefine before entry into or within the reaction zone.

The aluminum particles must be kept in continuous movement during the polymerization so that the polymer coating which forms is separated again from the aluminum surface by the rubbing of the aluminum particles against each other or against the walls of the vessel or against any steel or porcelain balls present. This can be achieved for example by whirling up the aluminum particles with the aid of gas introduced into the bottom of the reaction vessel. The powerful current of gas necessary for this purpose can be produced with a circulating gas blower. In this arrangement the solid polymer can be carried away from the specifically heavier aluminum by the gas current and collected in a separator. It is also possible, however, to charge the aluminum particles in the reaction vessel into a vibrating screen or in a rotary sieve drum and to gas them therein with the mixture of ethylene and metal halide. The solid polymer formed then falls through the sieve openings. Fresh polymer continually forms on the aluminum particles.

The partial pressure of the metal halides of the 4th to 6th sub-groups of the periodic system in the gas mixture can be chosen between about 0.1 and 100 Torr. and the partial pressure of the aluminum chloride between about 0.01 and 10 Torr. It is favorable for the course of the polymerization to incorporate in the olefine small amounts of an aromatic hydrocarbon, as for example benzene, xylene, tetrahydronaphthalene, and/or a halogen hydrocarbon, as for example ethyl chloride. For example 1 part of titanium-4-chloride may be mixed with 1 to 10 parts of benzene and the mixture sprayed or vaporized into the gas stream of the olefine or a carrier gas, for example nitrogen.

The following examples will further illustrate this invention but the invention is not restricted to these examples. The parts specified in the examples are parts by weight.

*Example 1*

120 parts of aluminum in the form of cubes having an edge length of 7 millimetres (the corners and edges having been previously ground off) are heated for 40 minutes with 4 parts of aluminum chloride and 80 parts of benzene at 80° C. Instead of heating the aluminum pieces with aluminum chloride, they may also be treated at 25° C. for 2 hours with 5 parts of bromine in 200 parts of benzene or with benzene which has been saturated with hydrogen chloride (or hydrogen bromide). The same activation is also obtained by heating the aluminum pieces for 10 minutes with 9.4 parts of ethylene bromide and 200 parts of benzene at about 80° to 90° C. The solution thereby obtained can be used for further batches. It is sufficient to immerse the aluminum pieces for 10 minutes in this solution at room temperature.

The aluminum cubes are then charged into a stirring vessel which is provided in its upper part with an inlet and outlet which are connected through a liquid pump to a polyethylene separator. The reaction vessel and the separator are filled with a solution of 3 parts of titanium-4-chloride in 850 parts of benzene. The solution is caused to circulate in the system at 50° C. Through an inlet pipe ethylene is introduced into the reaction vessel under normal pressure. Polyethylene is thereby formed on the aluminum cubes and is dispersed by the stirring in the liquid. Entrained by the circulating liquid, the polyethylene collects in the separator and is removed therefrom. To maintain the concentration of $TiCl_4$, 0.06 part of titanium-4-chloride is supplied per hour to the solution. The polyethylene removed is purified by washing with alcohol. There are thus obtained per hour about 5 parts of colorless film-forming polyethylene of the molecular weight 125,000 determined by the intrinsic viscosity.

The polyethylene may also be separated in a cyclone from the bulk of the liquid and then collected in the separator.

The aluminum particles may also be mixed with steel balls, for example of V2A-steel, of about the same size as the aluminum particles, to enhance the rubbing off of the polyethylene. The number of steel balls should not be more than half the number of aluminum pieces.

If the same proportions of vanadium-5-oxychloride be used instead of $TiCl_4$, about 1 part of polyethylene per hour is obtained under otherwise identical procedure. By the corresponding use of chromyl chloride, about 0.3 part of polyethylene per hour is obtained.

*Example 2*

120 parts of aluminum cubes having an edge length of about 7 millimetres are heated at 80° C. for 40 minutes with 4 parts of aluminum chloride and 80 parts of benzene. The aluminum cubes, while still moist with benzene, are charged under nitrogen into a sieve drum. The bulk volume of the aluminum should be about two-thirds of the volume of the sieve drum. The diameter of the meshes of the sieve is about 4 millimetres.

The sieve drum is rotatably arranged in a vessel.

Ethylene is led at room temperature through a washing vessel which is charged with titanium-4-chloride and benzene in the ratio 1:5. The ethylene saturated with the vapor of the said mixture at room temperature is then heated to 50° C. and led at this temperature over the aluminum particles in the reaction vessel. Solid polyethylene forms on the surface of the aluminum. The aluminum particles are kept in motion by rotation of the drum. The polyethylene is thereby stripped off from the aluminum particles and collects at the bottom of the reaction vessel. It is withdrawn thence and washed with alcohol. There are thereby obtained per hour about 5 parts of colorless solid polyethylene of the melting range 130° to 136° C.

*Example 3*

400 aluminum balls or aluminum alloy balls of a diameter of 12 millimetres are activated by heating for 40 minutes with a mixture of 40 grams of $AlCl_3$ and 5 litres of benzene. The balls, while still moist with benzene, are then charged into a drum of which the wall consists of a wire netting with a mesh width of about 6 millimetres. The aluminum balls occupy about one third to half the drum volume. The drum rotates in a vessel which has at the bottom a funnel-shaped widened portion connected with a separator for polyethylene. The rotational speed of the drum is 30 r.p.m.

Ethylene is led into the vessel. Part of the ethylene is led at 20° C. through a vessel which is filled with $TiCl_4$ and benzene in the ratio 1:5. The ethylene laden with the vapor of this mixture is then heated to 50° C. and led at this temperature together with pure ethylene over the aluminum balls in the drum. The addition of $TiCl_4$ may also be effected by spraying the liquid into the reaction chamber. Solid polyethylene forms on the surface of the aluminum. By rotating the drum, the aluminum balls are kept in movement. The polyethylene is thereby stripped off and falls through the drum wall into the polyethylene separator. It is removed from the separator and then washed with alcohol. About 500 grams of polyethylene per day are obtained.

To lead away the heat of reaction, benzene may be sprayed onto the aluminum balls through a pipe arranged in the interior of the drum. The benzene vaporizes and thereby cools the aluminum balls.

*Example 4*

Activated aluminum balls 6 millimetres in diameter are charged onto a sieve plate in a tube. The aluminum balls are kept in whirling motion by a powerful ethylene gas current at 50° C. The ethylene fresh gas is laden with $TiCl_4$-benzene mixture as described in Example 3. The ethylene not used up during the polymerization is led in circulation through a blower. It carries the polyethylene rubbed off from the aluminum balls into a cyclone. The polyethylene passes from the cyclone into a separator from which it is removed and then purified.

We claim:

1. A process for the continuous polymerization of ethylene which comprises contacting ethylene with pieces of aluminum in a reaction vessel in the presence of titanium tetrachloride, each dimension of said pieces of aluminum being from about 5 to about 20 millimeters, agitating said pieces of aluminum whereby said pieces are rubbed together to cause polyethylene which is formed on the surfaces of said pieces to be stripped from said pieces, and withdrawing said polyethylene from said reaction vessel, said polyethylene being substantially free of metallic aluminum.

2. A process as in claim 1 wherein said pieces of aluminum are in the form of balls.

3. A process as in claim 1 wherein said pieces of aluminum are in the form of cubes.

4. A process as in claim 1 wherein steel balls having a diameter of from about 5 to about 20 millimeters are placed in contact with said pieces of aluminum, the number of said steel balls being not more than half the number of said aluminum pieces.

References Cited in the file of this patent

UNITED STATES PATENTS

| | | |
|---|---|---|
| 2,079,934 | Fitch et al. | May 11, 1937 |
| 2,360,787 | Murphree et al. | Oct. 17, 1944 |
| 2,487,867 | Griffin | Nov. 15, 1949 |
| 2,715,117 | Baeyaert | Aug. 9, 1955 |
| 2,766,224 | Bannon | Oct. 9, 1956 |
| 2,779,752 | Vining | Jan. 27, 1957 |
| 2,891,041 | Matlack | June 16, 1959 |
| 2,899,418 | Reynolds | Aug. 11, 1959 |

FOREIGN PATENTS

| | | |
|---|---|---|
| 874,215 | Germany | Apr. 20, 1953 |
| 1,149,943 | France | July 29, 1957 |